U S 0 1 0 6 5 4 5 8 1 B 2

US010654581B2

(12) United States Patent
Morgan et al.

(10) Patent No.: US 10,654,581 B2
(45) Date of Patent: May 19, 2020

(54) AIRCRAFT FUEL SYSTEM

(71) Applicant: AIRBUS OPERATIONS LIMITED, Bristol (GB)

(72) Inventors: Angus Morgan, Bristol (GB); Christopher Slack, Bristol (GB)

(73) Assignee: Airbus Operations Limited, Bristol (GB)

( * ) Notice: Subject to any disclaimer, the term of this patent is extended or adjusted under 35 U.S.C. 154(b) by 349 days.

(21) Appl. No.: 15/342,514

(22) Filed: Nov. 3, 2016

(65) Prior Publication Data
US 2017/0129619 A1  May 11, 2017

(30) Foreign Application Priority Data

Nov. 5, 2015 (GB) .................................. 1519563.9

(51) Int. Cl.
*B64D 37/08* (2006.01)
*B64D 37/22* (2006.01)
*B64D 37/04* (2006.01)

(52) U.S. Cl.
CPC ............ *B64D 37/08* (2013.01); *B64D 37/04* (2013.01); *B64D 37/22* (2013.01); *Y02T 50/44* (2013.01)

(58) Field of Classification Search
CPC ........ B64D 37/08; B64D 37/20; B64D 37/00; B64D 37/02; B64D 37/22; B64D 37/28; B64D 37/14
See application file for complete search history.

(56) References Cited

U.S. PATENT DOCUMENTS

| 5,548,961 | A | 8/1996 | Luger et al. |
| 5,806,560 | A * | 9/1998 | Brown ................... B64D 39/00 |
| | | | 137/565.22 |
| 2010/0051749 | A1* | 3/2010 | Tanner ...................... B64C 3/34 |
| | | | 244/135 R |
| 2013/0284150 | A1 | 10/2013 | Lollini |
| 2014/0144917 | A1 | 5/2014 | Meillat et al. |
| 2015/0041004 | A1 | 2/2015 | Komoda |
| 2017/0210482 | A1* | 7/2017 | Morgan ................... B64C 3/34 |

FOREIGN PATENT DOCUMENTS

| CN | 104943869 | 9/2015 |
| DE | 43 42 210 | 6/1995 |
| EP | 0 278 755 | 8/1988 |
| WO | 2007/008185 | 1/2007 |

OTHER PUBLICATIONS

Combined Search and Examination Report for GB1519563.9, dated Apr. 28, 2016, 9 pages.

* cited by examiner

*Primary Examiner* — Christopher D Hutchens
(74) *Attorney, Agent, or Firm* — Nixon & Vanderhye P.C.

(57) ABSTRACT

An aircraft fuel system having a fuel tank and a baffle dividing the fuel tank into a primary fuel containing space and a secondary fuel containing space. A fuel drain is provided through which fuel flows from the primary fuel containing space into the secondary fuel containing space. A primary fuel outlet draws fuel from the primary fuel containing space and a secondary fuel outlet draws fuel from the secondary fuel containing space, wherein fuel flow through the primary fuel outlet causes fuel flow through the secondary fuel outlet. The mass flow rate of fuel through the fuel drain is restricted so that the allowable mass flow rate of fuel through the secondary fuel outlet is configured to be greater than the allowable mass flow rate of fuel through the fuel drain in the baffle.

27 Claims, 2 Drawing Sheets

AIRCRAFT FUEL SYSTEM

RELATED APPLICATION

This application claims priority to Great Britain patent application 1519563.9 filed Nov. 5, 2015, the entirety of which is incorporated by reference.

FIELD OF THE INVENTION

The present invention relates to an aircraft fuel system. In particular, the present invention relates to an aircraft fuel system that helps to minimise the quantity of unusable fuel in the aircraft fuel system. The present invention also relates to an aircraft wing having an aircraft fuel system, an aircraft having an aircraft fuel system, and a method of drawing fuel from an aircraft fuel tank of an aircraft fuel system.

BACKGROUND OF THE INVENTION

Fuel in an aircraft is typically stored in one or more fuel tanks. Such fuel tanks are generally disposed in the interior space of the wings and fuselage of the aircraft. A fuel delivery arrangement including a fuel pump is arranged to draw fuel from the or one of the fuel tanks and provide the fuel to one or more engines.

In one arrangement, a fuel pump is disposed in the fuel tank which draws fuel from the tank and feeds it along a pipe to be used by the one or more engines.

Due to the necessary structural arrangement which results in an irregular shape of the fuel tank and the provision of structural components extending in the fuel tank, together with requirements on the size of the fuel pump to be capable of drawing a sufficient volume of fuel, there are restrictions on the location of the fuel pump in the fuel tank. For example, internal structural components restrict the location of the fuel pump. It is therefore difficult to draw all of the fuel from the fuel tank. For example, it is not possible to dispose the fuel pump at the lowest point in the fuel tank; that is the lowest point in the fuel tank is defined as the lowest point to which fuel would flow when the aircraft is in its normal flight attitude. As such, there is a quantity of fuel in the aircraft that cannot be retrieved.

The fuel delivery arrangement is not able to draw all of the fuel contained in the fuel tank. This volume of fuel is therefore trapped in the fuel tank, and is not usable. This fuel is known as residual fuel. The residual fuel is excess weight carried by an aircraft which contributes to an increase in aircraft weight, a reduction in the efficiency of the aircraft, and reduces the volume of usable fuel that the aircraft is capable of carrying.

SUMMARY OF THE INVENTION

According to one aspect of the invention, there is provided an aircraft fuel system comprising a fuel tank for containing liquid fuel, a baffle dividing the fuel tank into a primary fuel containing space and a secondary fuel containing space, a fuel drain through which fuel is permitted to flow from the primary fuel containing space into the secondary fuel containing space, a primary fuel outlet configured to draw fuel from the primary fuel containing space, and a secondary fuel outlet configured to draw fuel from the secondary fuel containing space, wherein the secondary fuel outlet is configured so that fuel flow through the primary fuel outlet causes fuel flow to be drawn through the secondary fuel outlet, and wherein mass flow rate of fuel through the fuel drain is restricted so that the allowable the mass flow rate of fuel through the secondary fuel outlet is configured to be greater than the allowable mass flow rate of fuel through the fuel drain in the baffle.

With this arrangement it is possible to draw residual fuel from a fuel tank.

The primary fuel outlet may comprise a fuel pump to draw fuel through the primary fuel outlet.

The primary fuel outlet may comprise a fuel drawing end in fluid in communication with the primary fuel containing space.

The baffle extends proximate to the fuel drawing end of the primary fuel outlet. This means that it is possible to minimise the space in which residual fuel may remain.

The fuel pump may be at the fuel drawing end of the primary fuel outlet. This provides the most efficient location of the fuel pump.

The secondary fuel outlet may communicate with the primary fuel outlet.

The aircraft fuel system may further comprise an injector configured to draw fuel through the secondary fuel outlet in response to fuel drawn through the primary fuel outlet. Therefore, it is possible to efficiently draw fuel along the secondary fuel outlet. The provision of additional components to provide fuel flow through the secondary fuel outlet is minimised.

The injector may be configured to feed fuel passing through the injector to the primary fuel containing space.

At least part of the secondary fuel containing space may be below the primary receiving space.

At least part of the secondary fuel conduit may be below the primary receiving conduit.

The fuel drain may be in the baffle. Therefore, the arrangement of the aircraft fuel system is simplified.

The baffle may comprise a diaphragm. The fuel drain may be in the diaphragm.

At least part of the baffle may be porous, and the fuel drain may be formed by the at least part of the baffle that is porous.

The fuel drain may be at least one orifice.

The baffle may include a structural component of the aircraft. This helps reduce the number or size of additional components required.

The fuel drain may be in the structural component. Therefore, this may enable the fuel drain to be disposed in the most efficient location.

The aircraft fuel system may further include a vent. The vent may communicate with the secondary fuel containing space. This helps to reduce the pressure differential across the baffle.

The vent may be configured to allow the flow of fuel from the primary fuel containing space into the secondary fuel containing space in a first condition, and the vent may be restricted from allowing the flow of fuel from the primary fuel containing space into the secondary fuel containing space in a second condition.

According to another aspect of the invention, there is provided an aircraft fuel system as described herein with reference to FIG. 3.

According to another aspect of the invention, there is provided an aircraft fuel system as described herein with reference to FIG. 4.

According to another aspect of the invention, there is provided an aircraft wing comprising the aircraft fuel system according to any one of claims 1 to 19.

According to another aspect of the invention, there is provided an aircraft comprising the aircraft fuel system according to any one of claims 1 to 19.

According to another aspect of the invention, there is provided a method of drawing fuel from an aircraft fuel tank of an aircraft fuel system, the fuel tank having a primary fuel containing space, a secondary fuel containing space, a baffle dividing the fuel tank into the primary fuel containing space and the secondary fuel containing space, the method comprising the steps of drawing fuel from the primary fuel containing space through a primary fuel outlet, drawing fuel from the secondary fuel containing space through a secondary fuel outlet, and draining fuel from the primary fuel containing space into the secondary fuel containing space, wherein fuel flow through the primary fuel outlet causes fuel flow through the secondary fuel outlet, and wherein the mass flow rate of fuel drained from the primary fuel containing space into the secondary fuel containing space is restricted so that the allowable mass flow rate of fuel drawn from the secondary fuel containing space through the secondary fuel outlet is greater than the allowable mass flow rate of fuel drained from the primary fuel containing space into the secondary fuel containing space.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
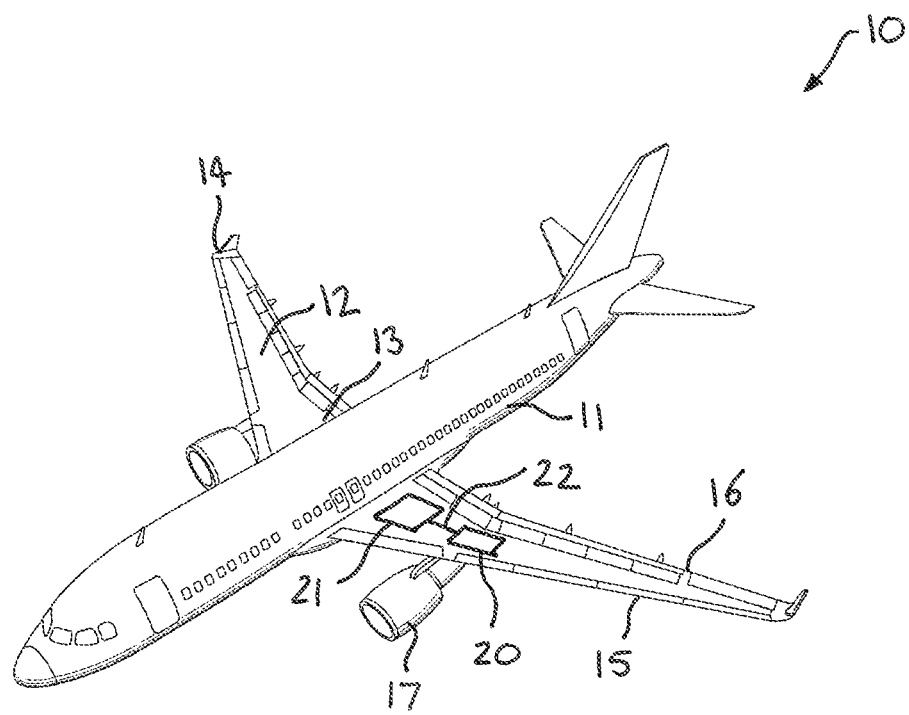
FIG. 1 is a view of an aircraft.

An aircraft 10 is shown in FIG. 1. The aircraft 10 includes a fuselage 11. Two wings 12 extend from the fuselage 11. It will be appreciated that the fuselage 11 and wings 12 may take a variety of different planform shapes and profiles depending on the particular application. Each wing 12 has a wing root 13 at the juncture with the fuselage 11, and a wing tip 14 at a distal end. The wing 12 has a leading edge 15 and a trailing edge 16. It will be appreciated that the structure of the wing 12 tends to incline in a spanwise direction, that is from the wing root 13 to the wing tip 14. Similarly the structure of the wing 12 tends to incline in a chordwise direction, that is from the trailing edge 16 to the leading edge 15. The aircraft 10 has two engines 17, although the number of engines may vary. Each wing 12 has one of the engines 17 mounted to the underside of the wing 12.

The engines 17 are supplied with fuel by an aircraft fuel system 20. The aircraft fuel system 20 comprises a fuel tank 21. The aircraft fuel system and fuel tank 21 are shown schematically in FIG. 1. Typically, one or more fuel tanks 21 are located in each wing 12, and one or more fuel tanks 21 are located in the fuselage 11. Fuel contained in the or each fuel tank 21 is fed to the or each engine 17 by a fuel delivery arrangement 22.

Figure 2:
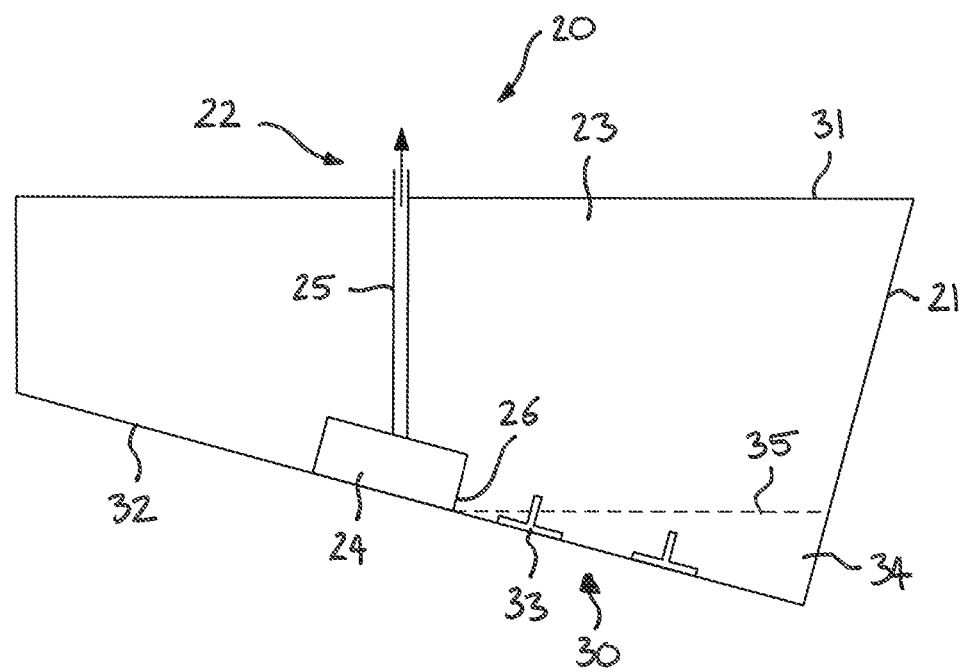
FIG. 2 is a schematic view of a known fuel tank.

A schematic cross-sectional profile view of part of a known arrangement of the aircraft fuel system 20 is shown in FIG. 2. The aircraft fuel system 20 includes the fuel tank 21 in the wing 12. Part of the fuel delivery arrangement 22 is also shown.

In FIG. 2, the fuel tank 21 extends in a chordwise direction, that is from trailing edge 16 to leading edge 15, from right to left. However, it will be understood that FIG. 2 may also demonstrate the fuel tank extending in the spanwise direction, that is from wing root 13 to wing tip 14, from right to left.

The fuel tank 21 defines a fuel receiving space 23. The fuel tank 21 is formed by structural components 30 of the aircraft 10. The structural components 30 include an upper skin 31 and a lower skin 32 of the wing 12. The lower skin 32 forms a base of the fuel tank 21. Further internal structural components 33 protrude into the fuel receiving space 23. Two such internal structural components 33 are shown in FIG. 2. The internal structural components 33 protrude from the lower skin 32 of the wing 12.

Part of the fuel delivery arrangement 22 is shown. The fuel delivery arrangement 22 comprises a fuel pump 24. The fuel pump 24 is received in the fuel receiving space 23. The fuel pump 24 is mounted to the lower skin 32. A fuel conduit 25 extends from the fuel pump 24 along which fuel from the fuel pump 24 is fed from the fuel tank 21 and towards the engines 17. The fuel pump 24 is operable to draw fuel from the fuel receiving space 23. The fuel pump 24 defines a fuel ingress 26 through which fuel is drawn from the fuel receiving space 23. It will be understood that once the level of fuel falls below the fuel ingress 26, fuel will no longer be drawn through the fuel delivery arrangement 22.

Due to the necessary structural arrangement of the aircraft 10, together with requirements on the size of the fuel pump 12 to be capable of drawing a sufficient volume of fuel, there are restrictions on the location of the fuel pump 12 in the fuel receiving space 23. For example, internal structural components 33 restrict the location of the fuel pump 12 on the lower skin 32. Therefore, it is not possible to dispose the fuel pump 12 at the lowest point in the fuel tank 21, that is defined as the lowest point when the aircraft is in its normal flight attitude. It has been found that the fuel delivery arrangement 22 is not able to draw all of the fuel contained in the fuel receiving space 23. This volume of fuel is therefore trapped in the fuel tank 12, and is not usable. This fuel is known as residual fuel 34 and the extent of the residual fuel 34 is demonstrated in FIG. 2 by dashed line 35.

The residual fuel 34 is excess weight carried by an aircraft which contributes to an increase in aircraft weight 10, a reduction in the efficiency of the aircraft 10 and reduces the volume of usable fuel that the aircraft 10 is able to carry.

Figure 3:
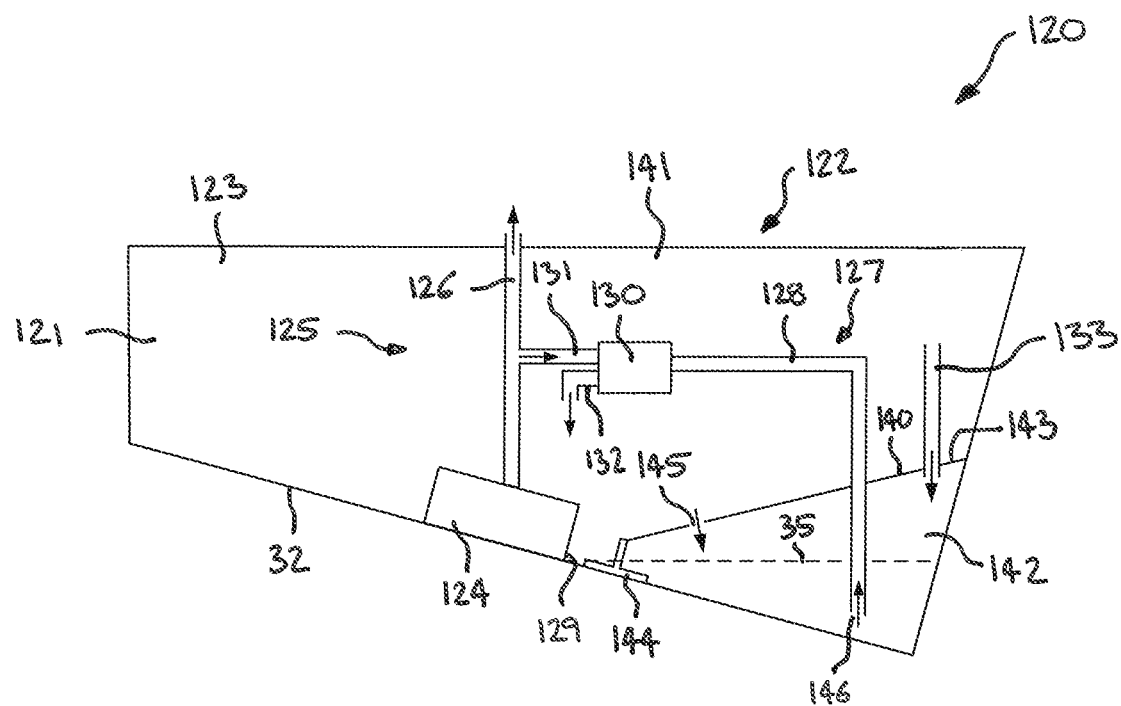
FIG. 3 is a schematic view of a fuel tank according to one embodiment of the present invention.

With reference to FIG. 3, a schematic cross-sectional profile view of an embodiment of part of the aircraft fuel system according to the present invention is shown. The arrangement of the fuel tank is generally the same as the fuel tank shown in FIG. 2, however the fuel delivery arrangement is different. As such, some reference numerals for corresponding features and components will be retained.

An aircraft fuel system 120 according to the present invention includes a fuel tank 121 in the wing 12. Part of a fuel delivery arrangement 122 of the aircraft fuel system 120 is also shown.

In the embodiment shown in FIG. 3, the fuel tank 121 extends in a chordwise direction, that is from trailing edge 16 to leading edge 15, from right to left. However, it will be understood that FIG. 3 may also demonstrate the fuel tank extending in another direction, for example in the spanwise direction, that is from wing root 13 to wing tip 14, from right to left, or another configuration.

The fuel tank 121 defines a fuel receiving space 123. The fuel tank 121 is formed by structural components 30 of the aircraft 10. The structural components 30 include an upper skin 31 and a lower skin 32 of the wing 12. The lower skin 32 forms a base of the fuel tank 121. Further internal structural components 33 protrude into the fuel receiving space 123. Two such internal structural components 33 are shown in FIG. 2. The internal structural components 33 protrude from the lower skin 32 of the wing 12.

A baffle 140 extends in the fuel receiving space 123. The baffle 140 separates the fuel receiving space 123 into a primary fuel containing space 141 and a secondary fuel containing space 142. In the present embodiment the volume of the primary fuel containing space 141 is significantly greater than the volume of the secondary fuel containing space 142, however it will be understood that the volume ratios may differ.

The baffle 140, in the present embodiment, is formed by a diaphragm 143 and a structural element 144 extending in the fuel tank 121, acting as a structural component.

The baffle 140 extends across the fuel receiving space 123 to prevent or restrict the flow of fuel between the primary fuel containing space 141 and the secondary fuel containing space 142. The baffle 140 extends from the periphery of the fuel receiving space 123 and forms a fluid seal therewith.

A fuel drain 145 controls the flow of fluid from the primary fuel containing space 141 into the secondary fuel containing space 142. That is, the flow rate of fuel into the secondary fuel containing space 142 from the primary fuel containing space 141 is determined by the fuel drain 145.

Figure 4:
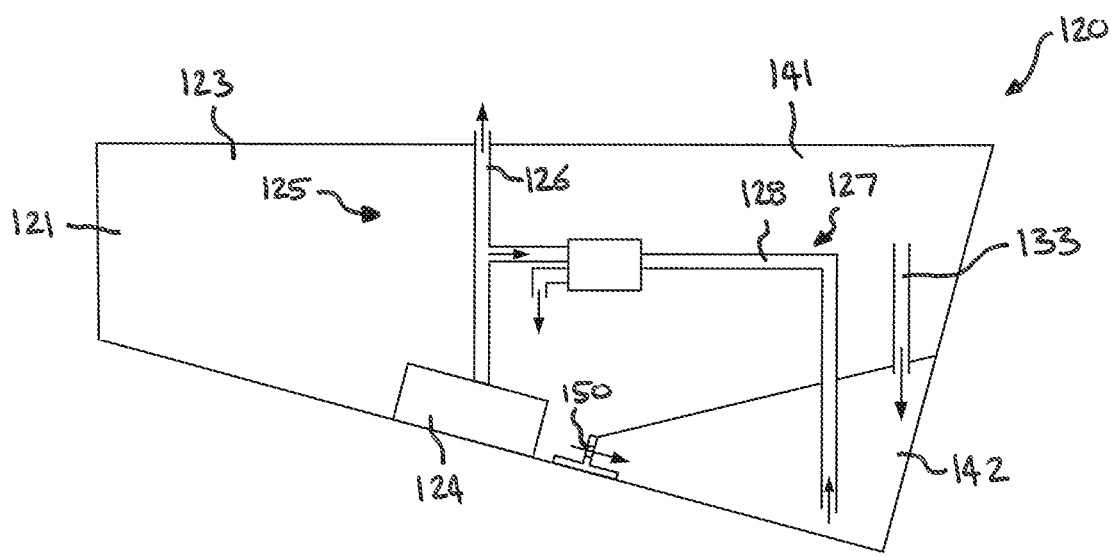
FIG. 4 is a schematic view of a fuel tank according to another embodiment of the present invention.

In the present arrangement, the fuel drain 145 is in the baffle 140. In particular, the fuel drain 145 is in the diaphragm 143. The fuel drain 145 is an orifice formed through the diaphragm 143. In an alternative arrangement, as shown in FIG. 4, the fuel drain 145 is formed through the structural element 144. That is a structural element orifice 150 extends through the structural element 144 between the primary fuel containing space 141 and the secondary fuel containing space 142.

The flow rate of fuel from the primary fuel containing space 141 and the secondary fuel containing space 142 is limited by the baffle 140 and fuel drain 145. By determining the flow area of the fuel drain 145 it is possible to control the flow rate of fuel from the primary fuel containing space 141 and into the secondary fuel containing space 142.

The secondary fuel containing space 142 is formed at the lower end of the fuel tank 121. That is, at least a portion of the secondary fuel containing space 142 is below the primary fuel containing space 141. The fuel drain 145 is at the lower end of the primary fuel containing space 141. Fuel contained in the primary fuel containing space 141 is able to flow through the fuel drain 145 into the secondary fuel containing space 142.

Although the baffle 140 is shown comprising the structural element 144 and the diaphragm 143, it will be understood that alternative arrangements are possible. In one embodiment, the diaphragm 143 is replaced by another sheet component, such as a panel, which may be flexible or rigid. The diaphragm or other sheet component may not be planar. The baffle 140, in one embodiment, does not include the structural element 144 protruding in the fuel tank 141. In such an arrangement, the baffle is fixed to the lower skin 32. Similarly, the baffle 140 in one embodiment, includes two or more structural elements protruding in the fuel tank 141. The arrangement of the structural element may differ.

Part of the fuel delivery arrangement 122 is shown. The fuel delivery arrangement 122 comprises a fuel pump 124. It will be understood that the specific configuration of the fuel pump may vary. The fuel pump 124 is received in the primary fuel containing space 142. The fuel pump 124 is mounted to the lower skin 32.

The baffle 140 extends below the fuel pump 124. The baffle 140 extends at or adjacent to the level of residual fuel (as indicated by dashed line 35) that would exist in the event that the baffle 140 is omitted.

A primary fuel outlet 125 draws fuel from the primary fuel containing space 141 to be fed to the engine 17. The primary fuel outlet 125 comprises the fuel pump 124 and a primary fuel conduit 126. The primary fuel conduit 126 extends from the fuel pump 124 and defines a passage along which fuel from the fuel pump 124 is fed from the primary fuel containing space 141 and towards the engines 17. The fuel pump 124 is operable to draw fuel from the fuel receiving space 123. The fuel pump 124 defines a primary fuel ingress 129 which is open to the primary fuel containing space 141 and through which fuel is drawn from the primary fuel containing space 141.

A secondary fuel outlet 127 draws fuel from the secondary fuel containing space 142 to be fed to the engine 17. The secondary fuel outlet 127 comprises a secondary fuel conduit 128. The secondary fuel conduit 128 defines a passage along which fuel from the secondary fuel containing space 142 passes towards the engines 17. The secondary fuel conduit 128 defines a secondary fuel ingress 146 which is open to the secondary fuel containing space 142 and through which fuel is drawn from the secondary fuel containing space 142. The secondary fuel ingress 146 is at the lower end of the secondary fuel containing space 142.

The secondary fuel outlet 127 comprises an injector 130. The injector 130 is disposed along the secondary fuel conduit 128. The injector 130 acts to draw fuel along the secondary fuel conduit 128 in response to fuel flow along the primary fuel conduit 126. Therefore, fuel is drawn from the secondary fuel containing space 142 along the secondary fuel conduit 128. In the present embodiment, the injector 130 is a jet pump, but it will be understood that the arrangement of the injector 130 may vary. For example, the injector 130 may be a turbine or inducer driven by flow from the fuel pump 124.

The injector 130 is spaced from the secondary fuel ingress 146. The injector 130 is disposed at an opposing end of the secondary fuel conduit 128 from the secondary fuel ingress 146. The injector 130 is in fluid communication with the secondary fuel conduit 128. The injector 130 is in fluid communication with the primary fuel outlet 125. An auxiliary duct 131 diverts fuel flow from the primary fuel outlet 125 to the injector 130.

Diverted fuel fed along the auxiliary duct 131 acts as motive fluid flow for the injector 130. That is, a small quantity of pressurised fuel flowing along the primary fuel outlet 125 from the fuel pump 124 is diverted to the injector 130. The injector 130 uses the Venturi effect to draw fuel along the secondary fuel conduit 128 in response to fuel flow through the primary fuel outlet 125. That is, fuel is urged to flow along the secondary fuel conduit 128 when fuel flows along the primary fuel outlet 125, and so a portion is diverted to the injector 130.

Fuel from the injector 130 is fed into the primary fuel containing space 141. Fuel from the injector 130 passes through a fuel exhaust 132 into the primary fuel containing space 141. Therefore, the fuel may flow to the fuel pump 124 to be fed from the fuel tank 121. Alternatively, the fuel may be fed directly to the fuel pump 124 from the fuel exhaust 132.

The secondary fuel outlet 127 and fuel drain 145 are configured so that, when fuel is drawn along the secondary fuel outlet 127, the allowable mass flow rate of fuel through the fuel drain 145 is less than the mass flow rate of fuel through the secondary fuel outlet 127. Therefore, the mass flow rate of fuel into the secondary fuel containing space 142 is configured to be less than the mass flow rate of fuel from the secondary fuel containing space 142.

A vent 133 communicates with the secondary fuel containing space 142. The vent allows the flow of a gas into the secondary fuel containing space 142 to reduce the pressure differential across the baffle when fuel flows into or out of the secondary fuel containing space 142. The vent 133 opens to the secondary fuel containing space 142 at the upper end of the fuel containing space 142.

When the primary fuel containing space 141 is substantially full with fuel, that is the fuel is above the level of the head of the vent 133 in the primary fuel containing space 141, fuel is able to rapidly flow into the secondary fuel containing space 142 during operation of the fuel pump 124 through both the fuel drain 145 and vent 133. Therefore, fuel is able to enter the secondary space through the vent 133 at the same rate as fuel is drawn from the secondary fuel containing space 142. This provides a fuel recirculation when the tank is full which helps to minimise a build-up of water in the secondary fuel containing space 142.

When the primary fuel containing space 141 is partially emptied of fuel, that is the fuel level is below the level of the head of the vent 133 in the primary fuel containing space 141, fuel is able to flow into the secondary fuel containing space 142 during operation of the fuel pump 124 through the fuel drain 145 only. Therefore, fuel is able to enter the secondary space through the fuel drain 145 only, at a rate which is less than the flow rate at which fuel is drawn from the secondary fuel containing space 142. In this condition, the vent 133 acts to vent the secondary fuel containing space 142. Therefore, the level of fuel in the secondary fuel containing space 142 reduces.

It will be understood that the vent 133 may be configured to act as a vent to the secondary fuel containing space 142 only. That is, fuel may be prevented from flowing along the vent 133.

In use, fuel is received in the fuel tank 121. Fuel is initially fed into the primary fuel containing space 141. As the fuel drain 145 is disposed at the lower end of the primary fuel containing space 141, fuel in the primary fuel containing space 141 flows into the secondary fuel containing space 142 through the fuel drain 145. Therefore, the second fuel containing space 142 is filled with fuel. Similarly, the primary fuel containing space 141 is filled with fuel. Therefore, the entire volume of the fuel receiving space 123 of the fuel tank 121 is utilised.

When fuel is required, the fuel pump 142 is operated and fuel is drawn through the primary fuel ingress 129 at the lower end of the primary fuel containing space 141. As the baffle 140 is provided adjacent to the primary fuel ingress 129, the lower end of the primary fuel containing space 141 is adjacent to the primary fuel ingress 129 and so the quantity of fuel in the primary fuel containing space 141 that is unable to flow to the primary fuel ingress 129 is minimised.

As fuel is drawn along the primary fuel outlet 125, the injector 130 is provided with a portion of fuel from the primary fuel outlet 125, to act as motive fluid, and is operable to draw fuel along the secondary fuel outlet 127. Therefore, fuel is drawn from the secondary fuel containing space 142 simultaneously with fuel being drawn from the primary fuel containing space 141. The fuel from the injector 130 is fed back into the primary fuel containing space 141. As the allowable mass flow rate of fuel through the fuel drain 145 is less than the mass flow rate of fuel through the secondary fuel outlet 127, the quantity of fuel in the secondary fuel containing space 142 reduces. Therefore, it is possible for the secondary fuel containing space 142 to be emptied of fuel.

As the secondary fuel ingress is provided at the lower end of the secondary fuel containing space 142 the quantity of fuel in the secondary fuel containing space 142 that is unable to flow to the secondary fuel ingress 146 is minimised.

Fuel that is drawn along the secondary fuel outlet 128 flows into the primary fuel outlet 125 such that all fuel from the fuel tank 121 is supplied to the engine 17 via the primary fuel outlet 125.

It will be understood that the injector 130 is operable to draw fluid from the secondary fuel containing space 142 and feed it to the primary fuel containing space 141 whenever the fuel pump 124 draws fuel from the primary fuel containing space 141. It will be understood that, in the embodiments described above, the fuel drain 145 is disposed above the primary fuel ingress 129 to allow fuel to be available to provide motive fuel to operate the injector 130 whenever there is fuel in the secondary fuel containing space 142. However, in another embodiment the fuel drain 145 is disposed level with or below the primary fuel ingress 129.

Although in the above described embodiments the fuel drain is an orifice, it will be understood that the arrangement of the fuel drain may differ. In particular, the fuel drain may comprise two or more orifices. In such an arrangement the plurality of orifices provides redundancy against one or more of the orifices becoming blocked.

Although the fuel drain is described in the above embodiments as being formed through the baffle, it will be understood that the fuel drain may be provided discretely from the baffle.

In the above described embodiments, the fuel drain is formed by an orifice. However, it will be understood that alternative arrangements are possible. For example, the diaphragm, or a portion of the diaphragm, may be permeable such that fuel is able to flow from the primary fuel containing space into the secondary fuel containing space. That is, the permeability of the diaphragm, or the portion of the diaphragm, will have a selected permeability which provides a predetermined flow rate between the primary fuel containing space and the secondary fuel containing space.

Although the invention has been described above with reference to one or more preferred embodiments, it will be appreciated that various changes or modifications may be made without departing from the scope of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft fuel system comprising:
a fuel tank configured to contain liquid fuel, wherein the fuel tank includes walls defining a fuel containing chamber;
a baffle dividing the fuel containing chamber into a primary fuel containing space and a secondary fuel containing space,
a fuel drain through which the liquid fuel flows from the primary fuel containing space into the secondary fuel containing space, wherein the fuel drain is configured to allow fuel to drain into the secondary fuel containing space from the primary fuel containing space at a rate no greater than a maximum mass flow drain rate;
a primary fuel outlet configured to draw the liquid fuel from the primary fuel containing space, and
a secondary fuel outlet configured to draw the liquid fuel from the secondary fuel containing space, wherein the secondary fuel outlet is configured to draw the liquid fuel at an allowable mass flow rate of the liquid fuel greater than the maximum mass flow drain rate;
wherein the secondary fuel outlet is configured so that the liquid fuel flow through the primary fuel outlet causes the liquid fuel flow to be drawn through the secondary fuel outlet, and
an auxiliary duct connects the secondary fuel outlet with the primary fuel outlet so that the secondary fuel outlet receives pressurized fuel from the primary fuel outlet.

2. The aircraft fuel system according to claim 1, wherein the primary fuel outlet comprises a fuel pump in fluid communication with the primary fuel outlet.

3. The aircraft fuel system according to claim 2, wherein the primary fuel outlet comprises a fuel drawing end in fluid communication with the primary fuel containing space.

4. The aircraft fuel system according to claim 3, wherein the baffle extends proximate to the fuel drawing end of the primary fuel outlet.

5. The aircraft fuel system according to claim 3, wherein the fuel pump is at the fuel drawing end of the primary fuel outlet.

6. The aircraft fuel system according to claim 1, further comprising an injector configured to draw fuel through the secondary fuel outlet in response to fuel drawn through the primary fuel outlet.

7. The aircraft fuel system according to claim 6, wherein the injector is configured to feed fuel passing through the injector to the primary fuel containing space.

8. The aircraft fuel system according to claim 1, wherein at least part of the secondary fuel containing space is below the primary fuel containing space.

9. The aircraft fuel system according to claim 1, wherein at least part of the secondary fuel outlet is below the primary fuel outlet.

10. The aircraft fuel system according to claim 9, wherein the fuel drain is in the baffle.

11. The aircraft fuel system according to claim 10, wherein the baffle comprises a diaphragm and the fuel drain is in the diaphragm.

12. The aircraft fuel system according to claim 10, wherein at least part of the baffle is porous, and the fuel drain is formed by the at least part of the baffle that is porous.

13. The aircraft fuel system according to claim 1, wherein the fuel drain is at least one orifice.

14. The aircraft fuel system according to claim 13, wherein the baffle comprises a structural component of the aircraft and the fuel drain is in the structural component.

15. The aircraft fuel system according to claim 1, further comprising a vent, the vent communicating with the secondary fuel containing space.

16. The aircraft fuel system according to claim 15, wherein the vent is configured to allow the flow of fuel from the primary fuel containing space into the secondary fuel containing space in a first condition, and the vent is restricted from allowing the flow of fuel from the primary fuel containing space into the secondary fuel containing space in a second condition.

17. An aircraft wing comprising the aircraft fuel system according to claim 1.

18. An aircraft comprising the aircraft fuel system according to claim 1.

19. The aircraft fuel system of claim 1, wherein the baffle and the walls entirely separate the secondary fuel containing space from the primary fuel containing space.

20. The aircraft fuel system of claim 1 wherein the fuel drain is at or below an elevation of a fuel pump in the primary fuel containing space.

21. The aircraft fuel system of claim 20, including a vent having an inlet open to the primary fuel containing space and an outlet open to the secondary fuel containing space, wherein the opening is above the elevation of the fuel pump.

22. The aircraft fuel system of claim 1, wherein the secondary fuel outlet includes an inlet in a region of the secondary fuel containing space below a lowermost region of the primary fuel containing space.

23. A method of drawing fuel from an aircraft fuel tank of an aircraft fuel system, the fuel tank having a primary fuel containing space, a secondary fuel containing space, a baffle dividing the fuel tank into the primary fuel containing space and the secondary fuel containing space, the method comprising:
drawing fuel from the primary fuel containing space through a primary fuel outlet,
drawing fuel from the secondary fuel containing space through a secondary fuel outlet,
draining fuel from the primary fuel containing space into the secondary fuel containing space, wherein the draining of the fuel is through a drain between the secondary fuel containing space and the primary fuel containing space, and the drain is configured to permit fuel flowing at most at a maximum mass flow drain rate, and
supplying pressurized fuel from the primary fuel outlet to the secondary fuel outlet to cause fuel flow through the secondary fuel outlet,
wherein the maximum mass flow drain rate of fuel is less than an allowable mass flow rate of fuel drawn from the secondary fuel containing space through the secondary fuel outlet.

24. The method of claim 23, wherein the baffle and the walls entirely separate the secondary fuel containing space from the primary fuel containing space.

25. The method of claim 24, wherein the secondary fuel outlet includes an inlet in a region of the secondary fuel containing space below a lowermost region of the primary fuel containing space.

26. The method of claim 23, wherein the drain is at or below an elevation of a fuel pump in the primary fuel containing space.

27. The method of claim 26, further comprising venting fuel between the primary fuel containing space and the secondary fuel containing space through a vent in an upper elevation of the primary fuel containing chamber, wherein the vent has an opening in the primary fuel containing space which is above the elevation of the fuel pump.

* * * * *